United States Patent
Stacey et al.

(10) Patent No.: US 6,266,342 B1
(45) Date of Patent: Jul. 24, 2001

(54) ADAPTION RESOURCE MODULE AND OPERATING METHOD THEREFOR

(75) Inventors: David John Stacey, Stanstead Abbotts; Simon Daniel Brueckheimer, London; Martin Sproat, Herts; Andrew Geoffrey Tomlins, Harlow; Fai Tsang, Chelmsford; John Shotton, Wickford, all of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/057,222

(22) Filed: Apr. 8, 1998

(51) Int. Cl.[7] .................................................. H04J 12/66
(52) U.S. Cl. ........................ 370/465; 370/463; 370/395; 370/286; 370/526
(58) Field of Search .................................. 370/286, 389, 370/392, 395, 396, 399, 463, 465, 466, 467, 469, 526

(56) References Cited

U.S. PATENT DOCUMENTS

| | | | |
|---|---|---|---|
| 5,539,744 | * 7/1996 | Chu et al. | 370/379 |
| 5,592,622 | * 1/1997 | Isfeld et al. | 709/207 |
| 5,623,491 | * 4/1997 | Skoog | 370/397 |
| 5,691,650 | 11/1997 | Bach et al. | 395/200.01 |
| 5,752,068 | * 5/1998 | Gilbert | 712/16 |
| 5,812,644 | * 9/1998 | Bowater et al. | 379/93.14 |
| 5,949,791 | * 9/1999 | Byers et al. | 370/366 |
| 6,009,507 | * 12/1999 | Brooks et al. | 712/28 |

FOREIGN PATENT DOCUMENTS

| | | |
|---|---|---|
| 2 241 854 | 9/1991 | (GB) . |
| 91/16679 | 10/1991 | (WO) . |
| 95/17787 | 6/1995 | (WO) . |
| 95/32596 | 11/1995 | (WO) . |
| 95/32597 | 11/1995 | (WO) . |

* cited by examiner

Primary Examiner—Hassan Kizou
Assistant Examiner—Ahmed Elallam
(74) Attorney, Agent, or Firm—Lee, Mann, Smith, McWilliams, Sweeney & Ohlson

(57) ABSTRACT

In order to support both signalling processing on a per channel basis and multiple adaptation protocols, an interface (10) is modularised principally by function. Incident channels (60–62, $Ch_o$—$Ch_n$) are applied to a routing device (16) that consults a connection map (64) to determine an appropriate path, via an interface (90), for signal processing of each channel, as shown in FIG. 2. Modularised processing platforms (70–74) each contain a number of signal processors (80–86), with each processing platform providing an additional level of indirection with respect to channel handling. In this latter respect, one of the signal processors (86) on each platform is assigned to distribute channel processing to appropriately configured other ones of the signal processors and such that signal processing functions may be distributed between the other ones (80–84) of the signal processors. The present invention is particularly useful in relation to a narrowband-broadband interface to support differing adaptation protocols that require different signal processing functions and also to vary signal processing capabilities on a per call basis.

39 Claims, 3 Drawing Sheets

ADAPTION RESOURCE MODULE AND OPERATING METHOD THEREFOR

BACKGROUND TO THE INVENTION

This invention relates, in general, to an adaptable adaptation resource module and operating method therefor, and is particularly, but not exclusively, applicable to a digital signal processing resource that is provisioned to support numerous different adaptation protocols. More especially, the present invention is pertinent to an adaptable interface of a broadband-narrowband network, and particularly between an asynchronous transmission mode (ATM) network and a narrowband communication system supporting trunk circuits in which adaptation is required between time division multiplexed (TDM) communication and ATM communication.

SUMMARY OF THE INVENTION

Globally, telecommunication systems can generally be considered to be in a transitional phase between first generation narrowband digital networks (such as the global system for mobile (GSM) cellular communication system) and future multi-media digital networks (such as the universal mobile telecommunication system (UMTS)) having broadband capabilities. Indeed, radio frequency (RF) and wireline systems are being merged together to enhance the information transfer mechanism, while still providing some flexibility with respect to mobility within the network. For example, broadband (typically fibre-optic based) infrastructure connections are being utilised to support information (both voice and data) transfer between cellular RF coverage areas. The transition to broadband systems is, in fact, necessarily required to support higher data rate communications, including video and Internet applications that are presently being both considered and made available to subscribers to the service. Unfortunately, this transitional phase also presents system operators with several dilemmas, and also prejudices immediate implementation of such broadband systems. For example, until such a time when a free-standing broadband system becomes an accepted and freely available standard for all subscriber terminals (such as cellular telephones and data transmission devices, e.g. landline modems and computer terminals), system operators are reticent to write-off their significant investments in current narrowband infrastructure technology. Indeed, such narrowband infrastructure technology already provides a rich set of services and service creating environments that would have to be re-implemented to allow deployment in stand-alone broadband networks. Consequently, present day narrowband systems must be adapted to accommodate both narrowband and broadband users; with this statement particularly relevant to call establishment and inter-working procedures between these different forms of communication system.

As will be understood, for an effective migration between narrowband and broadband, system operators must particularly and necessarily consider an inter-working scenario in which all subscribers connect to a narrowband network, but one or more intermediate broadband networks are used to relay information between these narrowband subscribers. In fact, this very situation has been discussed in co-pending U.S. patent application Ser. No. 08/907,521 filed on Aug. 8, 1997 in the name of J. F. B. Cable et al. and assigned to Northern Telecom Limited, which co-pending US patent application is further identified by its title "SYSTEM AND METHOD FOR ESTABLISHING A COMMUNICATION CONNECTION"

In more detail, telecommunication networks comprise nodes connected by communication resources (usually termed "links"), with a particular network technology characterised both by the means of transmission of user and control information along these links and also by the routing and relaying functions embodied in the nodes. The term routing is used to describe the process of determining the path the information will take through the network while the term relaying is the process of transferring information from one link to another, i.e. the information is merely passed, without alteration, from one channel resource to another.

Taking GSM as an exemplary form of narrowband digital network, user and control information (or "data") is interleaved, using time division multiplexing (TDM), on a sixty-four kilobit per second (kbps) bearer channel. More especially, the sixty-four kbps bearer channels, typically encoded with a pulse code modulation, are communicated between the base station sub-system (BSS) and the mobile service switching centre (MSC) over an E1 link. Indeed, each bearer channel can be framed to support four voice calls of sixteen kbps comprised from thirteen kbps of sampled and encoded speech and three kbps of ancillary information, such as parity check and correction bits (and the like) and synchronisation information. Data is then relayed across a node by some form of synchronous TDM switching fabric, often of the "time-space-time" type, although other fabric arrangements are equally applicable. Control information (e.g. call set-up and tear-down messages) logically follows the same path (although not always the same physical path) through the network as user information and is terminated in each node for routing purposes. Routing is conventionally performed in each node on a "hop-by-hop" basis using long lived routing tables, i.e. the node is sufficiently intelligent to determine an optimum route of the succeeding connection. Control information is regulated by a signalling scheme that is distinctive to the type of network employed. Particularly, public signalling schemes are used between nodes by a public network and between public networks of different operators. Signalling scheme No. 7 is an important example of a public signalling scheme access signalling schemes used between subscribers and edge nodes of public networks, e.g. between a radio telephone and base station sub system. In fact, the most common digital access signalling schemes are common channel signalling schemes, such as the integrated services digital network (ISDN) DSS1 (and its predecessors) and channel associated signalling schemes that are both derived from analogue signalling. Private schemes are, generally, derived from access schemes but provide richer functionality with impersonal networks, such as within a secure private branch exchange (PBX).

On the other hand, broadband digital networks are characterised in that user and control information is transmitted in fixed or variable length "packets", with these packets pre-pended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmissions are, however, similar to that for the narrowband case and differ only in as much as the signalling schemes are technology specific.

To facilitate use of broadband networks and the migration of communication networks to high data-rate technologies (e.g. the two mega-bit per second rate envisaged within UMTS), there is a need to provide an effective mechanism for interconnecting narrowband networks through a transparent broadband ether. In other words, the broadband ether must accommodate and support narrowband signalling schemes without affecting either data integrity or in any way inhibiting data flow or interconnection. As such, a narrowband-broadband interface must contain adaptation modules that freely translate between TDM and ATM, for example.

With respect to an interface between a narrowband and broadband network, it would be desirable for digital signal processors (DSPs) to be provisioned to support current and enhanced signalling schemes and therefore to be able to provide different functionality and processing requirements demanded by different types of communication. More particularly, when moving from an asynchronous narrowband domain into an ATM (packet) domain (and back again) each TDM voice channel, generally, requires a separate and dedicated virtual circuit in the broadband system. Moreover, service providers must provision for the selective inclusion of additional circuits, e.g. in relation to echo cancellation arising as a consequence of a delay path in a voice channel exceeding stipulated parameters. Indeed, when considering the issues of delay, meaningful voice communication across a channel is achieved with a pure delay of less than one hundred and fifty (150) milliseconds. However, since the signal is likely to suffer from echo, telecommunications standard bodies have stipulated that echo cancellation must be applied to all channels having a one-way delay of greater than twenty-five milliseconds. Furthermore, while the inclusion of echo cancellation circuitry may not be required for short voice calls, long distance calls (such as intercontinental calls) inherently suffer from transmission delays. Therefore, when considering deployment of infrastructure, network operators can either presently provide individual (but physically separate and external) echo cancellation circuitry for every voice channel and associated virtual channel or, alternatively, can provide a pooled voice cancellation resource estimated as being capable of servicing the requirements of the network. In the former respect, the provision of individual echo cancellers is too expensive to provide a financially viable scheme, while the provision of a pooled resource capability may not accommodate demand during busy periods (and hence may inhibit the utilisation of the network and potentially induce dissatisfaction with subscribers to the network).

To further appreciate the requirement of having an adaptable DSP resource module, one necessarily should consider the plethora of broadband adaptation schemes that are presently employed or which are being developed or evolved. Specifically, adaptation protocols such as AAL-1 (and structured data transfer, SDT), AAL-2 and AAL-5 impose very different requirements on processing capabilities of a communication network, especially in relation to a narrowband-broadband interface.

AAL-1 is an ATM adaptation protocol targeted at constant bit rate (CBR) traffic, e.g. voice or video, and is applicable to data rates equal to or exceeding sixty-four kbps. More particularly, narrowband voice signals at sixty-four kbps are packaged into ATM cells having an overall length of fifty-three bytes; five bytes of which are used as a cell header whilst the remaining forty-eight bytes support the payload. The cell header contains control and routing information, such as the virtual circuit identifier (VCI). With respect to the payload in AAL-1, a first byte (or "octet") is reserved for a sequence number that provides an error correction facility, while the remaining forty-seven octets are allocated to voice samples. Every eight cells, an additional byte is stolen from the available octets allocated to voice samples, which stolen byte is used as a pointer to indicate a structure boundary. The pointer field therefore allows multiplexed transmissions of multiple voice channels, as will be appreciated.

previously indicated, an absolute delay in a one-way path must not exceed twenty-five milliseconds, or else an echo canceller must be incorporated within the voice call. Unfortunately, in relation to cell assembly of a sixty-four kbps PCM voice channel, a delay of six milliseconds is introduced merely by the provision of sampling. Consequently, an allowable path delay is immediately reduced to nineteen milliseconds, which reduced period is easily exceeded in moderate and long distance calls, e.g. a long distance call between Washington D.C. and San Francisco. Furthermore, conversion of the cell into a narrowband component for onward routing of the call further reduces the available nineteen milliseconds assigned to accommodate all additional delays.

AAL-5 provides a capability of data and voice transmissions to work stations, and is therefore particularly applicable to multi-media communication systems. ML-5 segments long data structures into many cells, with a data structure conceivably exceeding fifteen hundred octets in length. AAL-5 similarly provides error correction in the packetised header, while also using a bit in the header to indicate the continuation or end of a long data structure. Furthermore, control information included within the AAL-5 protocol also stipulates how may cells have been consolidated together to produce the long data structure and will also include CRC check bit information for error correction. When carrying voice, the ML-5 structure is typically only one cell in length and, as such, may require the provision of echo cancellers. However, the support of data communications by AAL-5 is inherently immune to delay because data transmissions are not time dependent for coherent understanding.

The AAL-2 adaptation scheme is designed to support compressed voice at or below rates of sixty-four kbps. Indeed, compression algorithms, such as ADPCM (adaptive differential pulse code modulation) or LD-CELP (low-delay, code excited linear prediction) can enable voice channels to be compressed from sixty-four kbps to rates typically between four kbps and thirty-two kbps. Additional channel utilisation can be achieved by suppressing any silent intervals that occur naturally in speech (especially bearing in mind that one person in a call is typically silent when listening to the other party talk), which suppression can enable a further bandwidth saving of over 50%.

It will therefore be appreciated that, in an eight kbps compression scheme, it takes forty-seven milliseconds to fill an ATM cell, with this time representing an unacceptable delay in most commercial applications. Further, with respect to AAL-1, it is not possible to support silence suppression. These problems can, however, be addressed and to some extent resolved by using AAL-2 that multiplexes a number of compressed voice channels into a single virtual channel (VC). In fact, the packet lengths in AAL-2 can be arbitrarily small (from 1 octet to sixty-four octets in length) which enables the packet size (and hence the sampling delay) to be tailored to the compression rate being used (e.g. at eight kbps a packet payload size of eight octets takes just eight milliseconds to fill). AAL-2 allows up to two-hundred and fifty-six mini-channels to be supported on a single virtual circuit. As will be understood, AAL-2 is a new standard that, at present, is not widely used and, in some instances, is less efficient than AAL-1. More specifically, in the latter respect and specifically in relation to relatively long data structures, AAL-2 requires an increased control overhead associated with the provision of additional mini-cell headers.

A requirement therefore exists to provide a flexible adaptation and DSP resource module that can accommodate various adaptation (or signalling) protocols and which can provision for echo-cancellation, for example, on a cost-effective basis while still being sufficiently resourced to support both relatively high instantaneous demand and future increases for ancillary signal processing required by multi-media applications.

SUMMARY OF THE INVENTION

According to a first aspect of the present invention there is provided a signal processing environment for an interface that interconnects a plurality of information-bearing channels between a broadband network and a narrowband network, the signal processing environment comprising: at least one processing platform for selectively applying signal processing functions to at least some of the plurality of information-bearing channels, the at least one processing platform having a master signal processing element and a plurality of slave signal processing elements operationally responsive to the master signal processing element, the master signal processing element coupled to receive the plurality of information-bearing channels and arranged to apply a routing function to the plurality of information-bearing channels such that signal processing of at least some of the plurality of information-bearing channels is selectively distributed between the plurality of slave signal processing elements.

In a preferred embodiment, the at least one processing platform supports all inter-working functions between a narrowband network and a broadband network.

In a particular embodiment, at least some of (and preferably all of) the plurality of processing platform support all inter-working functions between a narrowband network and a broadband network, with at least one of the plurality of processing platforms configured to perform a warm standby function. In this respect, warm standby offer a one spare to N redundancy, with the allocated warm standby processing platform having an associated memory containing a system map detailing processing functions associated with individual information-bearing channels.

In another aspect of the present invention there is provided a signal processing platform for selectively applying signal processing functions to at least some of a plurality of information-bearing channels incident thereto, the signal processing platform having: a plurality of slave signal processing elements; and a master signal processing element coupled to receive the plurality of information-bearing channels and configured with a routing function arranged to route the plurality of information-bearing channels to the plurality of slave processing elements, the routing function distributing signal processing of at least some of the plurality of information-bearing channels between the plurality of slave signal processing elements.

A further aspect of the present invention provides a communication system interface responsive to a plurality of information-bearing channels, the interface comprising: a plurality of processing platforms for applying signal processing functions to at least some of the plurality of information-bearing channels; and a routing device coupled to the plurality of processing platforms and responsive to the plurality of information-bearing channels, the routing device configured to distribute the plurality of information-bearing channels between the plurality of processing platforms.

In still yet another aspect of the present invention there is provided a method of providing signal processing to a plurality of channels incident to a processing farm containing a plurality of slave elements each having a signal processing capability and a master control element both coupled to the plurality of slave elements and arranged to receive the plurality of information-bearing channels, the method comprising the steps of: providing the master control element with a routing function that selectively routes information-bearing channels to specified ones of the plurality of slave processing elements; receiving an information-bearing channel; and applying the routing function to distribute signal processing of at least some of the plurality of information-bearing channels between the plurality of slave elements.

In still yet a further aspect of the present invention there is provided a signal processing platform module for integrating into the signal processing environment previously described in relation to the first aspect of the present invention. Indeed, the module contains a processing platform for selectively applying signal processing functions to at least some of the plurality of information-bearing channels, and has an associated memory that contains a system map detailing processing functions associated with individual information-bearing channels. The module therefore supports all inter-working functions between a narrowband network and a broadband network, and provides an ability to extend the system.

In another aspect of the present invention there is provided a method of providing signal processing to a plurality of information-bearing channels incident to an interface having a routing device coupled to a plurality of processing platforms each arranged to support all inter-working functions bi-directionally between a narrowband network and a broadband network, the method comprising the steps of: in the routing device, distributing the plurality of information-bearing channels between the plurality of processing platforms; and applying processing to at least some of the information-bearing channels in a processing platform to which the information-bearing channels have been routed.

In relation to all of the various aspects of the present invention, the slave elements can each have dedicated and assigned signal processing functions, although they may each support a plurality of signal processing functions. Consequently, a preferred embodiment of the present invention can dynamically vary the distribution of information-bearing channels according to instantaneous signal processing demands of individual information-bearing channels.

Furthermore, the numerous aspects of the present invention can be combined to provide multiple levels of indirection with respect to signal processing, with the indirection provided at both a DSP level and at a modularised board level. Indeed, indirection of information-bearing channels may be undertaken on an individual or block assignment basis.

The adaptation resource module and DSP arrangement of the present invention therefore advantageously support per channel ATM adaptation and a per channel DSP capability, while the DSP capability can be used beneficially to provide per channel echo cancellation, tone detection and other signal processing functionality, e.g. voice compression. The present invention acquires these advantages from both the physical partitioning of DSP functionality and the flexibility provided by the new interface between DSP modules and adaptation circuitry.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
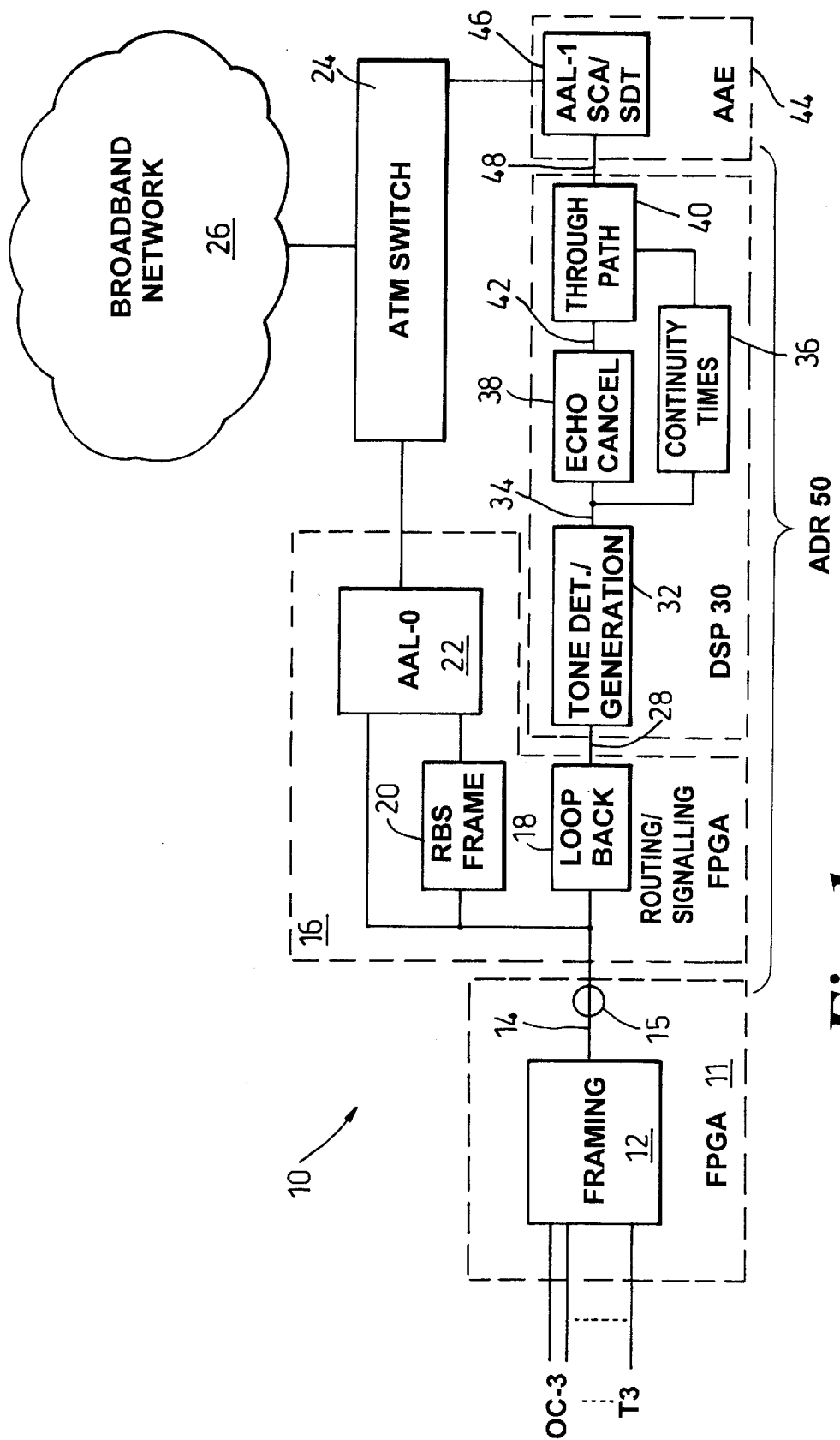
FIG. 1 is a block diagram showing a modularised architecture of a narrowband-broadband interface according to a preferred embodiment of the present invention.

FIG. 1 shows a block diagram of a modularised processing platform 10 for a narrowband-broadband interface according to a preferred embodiment of the present invention. A field programmable gate array (FPGA) card 11 contains framing and control logic circuitry 12 responsive to multiple communication links, such as OC-3 or T-3 links (or their functional equivalent). Together, the communication links in the synchronous domain typically support up to approximately two thousand DS-0s (i.e. individual sixty-four kilobit per second (kbps) data or digitised voice channels, typically realised by an 8-bit pulse code modulation (PCM)). Recovered DS-0 channels are subjected to rate adaptation and some basic routing (or segregation) functions by the framing and control logic circuitry 12 that can, for example, effectively distinguish between control information and traffic (both voice and data signals).

Appropriately framed and rate adapted data 14 is coupled to a specialist routing and signalling FPGA 16 that provides supplementary routing of the framed data 14 based upon the content of the framed data. The modularised processing platform 10 may, in fact, contain one or more routing and signalling FPGAs.

An interface between the FPGA 11 and the routing and signalling FPGA 16 is implemented, in a preferred embodiment, by an appropriate ATM-based interface, such as the RAINBOW TDM AAL interconnect supplied by Nortel Limited of Montreal, Canada. Alternatively, the modules (i.e. the FPGA 11 and an adaptation resource module containing the routing and signalling FGPA 16) could be interconnected via a high-speed electrical or optical interconnect operating to support TDM (directly) or ATM.

The interface 15 is required by the preferred embodiment to allow the modules of the present invention to be connected via a local ATM back plane, and hence provides a low-delay and efficient mechanism for the transport of TDM data 14 across ATM links whilst fully maintaining any inherent TDM frame structures, i.e. the interface 15 supports multiple synchronous and asynchronous E1/T1s across an ATM node. More specifically, the interface 15 enables a de-coupling of function between ATM framing and ATM adaptation between separate cards. The framed data 14 can be applied to a loop-back circuit 18 within the routing and signalling FPGA 16. The loop-back circuit 18 is selectively enabled or disabled to achieve logical flow, i.e. the loop-back circuit is selectively operative to retain TDM information within the synchronous TDM domain by providing loop back of incident TDM data, e.g. for testing purposes.

With respect to control data, a rob bit signalling (RBS) frame processor 20 (within the routing and signalling FPGA 16) receives the framed and rate adapted data 14. The RBS frame processor 20 acts to extract control information bits from the information stream and to package these robbed bits into a control stream that is transported via AAL-0 to a remotely located control processor. Specifically, an output from the RBS frame processor 20 is coupled to an input of an AAL-0 signalling processor 22 (shown here as being integrated into the routing and signalling FPGA 16, although it could be separate) that is also responsive to the framed and rate adapted data 14. An output from the AAL-0 signalling processor 22 (that provides additionally signalling flexibility for use within maintaining internal system interconnections) is provided to a broadband switch (such as an ATM switch) 24 in a packetised format for subsequent transmission across a broadband network 26, as will be understood.

To achieve the desired logical information flow, the loop back circuit 18 is typically enabled and disabled by the overall control functionality of the routing and signalling FPGA 16. Particularly, the DS-0s are either: i) looped back into the TDM domain; ii) passed unhindered into a DSP environment for processing (to be described later); or iii) routed directly to an ATM adaptation entity (AAE). Data signals 28 that by-pass the loop-back function are digitally processed in a digital signal processing environment/array (function block 30 of FIG. 1) that supports tone detector/generation functionality (block 32) arranged to detect narrowband fax, modem and other in-band signalling (such as dual tone multiple frequency, DTMF). The tone detector/generation functionality, typically embedded as firmware, can then apply appropriate processing to the incident data signals 28, as will readily be understood. Output signals 34 emanating from the tone detector/generation functionality 32 are then selectively applied either to a continuity tone monitor/generator function (block 36 in the case of tones being detected) or, in the case of voice signals, to an echo cancellation function (block 38).

Signals emanating from the echo cancellation block 38 and the continuity tone monitor/generator block 36 are then provided to a thru-path routing matrix 40 that, like the echo cancellation and continuity tone monitor/detector, is also realised within the programmable nature of the DSP environment 30. As will be understood, the thru-path routing matrix 40 provides a plurality of selectable and alternative paths through which incident signals 42 are ultimately coupled to a separate ATM adaptation entity (AAE) 44. The AAE 44 contains a control processor arrangement 46 responsive to digitally processed signals 48 output from the thru-path matrix 40, which processor arrangement 46 functions to map a single narrowband channel into a dedicated virtual circuit (and vice versa) based upon Single Channel Adaptation (SCA) in ATM adaptation layer 1 (AAL-1) signalling, for example. Furthermore, since the narrowband DS-0 is a single channel, no frame integrity is required to be preserved in the asynchronous domain and thus no pointers are generated within the cell. The control processor 46 may also support AAL-2 and AAL-5, for example. The AAE 44 is further coupled to the ATM switch 24.

As will be understood, AAL-1 may support multi-rate N×64 kbps channels whereby narrowband data is adapted into the ATM (asynchronous) domain while satisfying ITU recommendation 1.363.1. Therefore, for AAL-1 Structured Data Transfer (SDT), all cells generated from the process controller 46 are of the non-N format with forty-seven octets per payload given over to user information. AAL-1 may also support structured data transfer (SDT) p-format.

It is the AAE 44 (and particularly the control processor arrangement 46) that supports SDT that enables structural information to be preserved across the ATM domain, as will be appreciated. In this latter instance, structural points will be required (as previously indicated) if the number of 64 kbps timeslots mapped in each frame period is two or more.

As such, a subsequent de adaptation function is able to maintain frame integrity after the frame has been communicated in a cell across the ATM (broadband) network 26.

Figure 2:
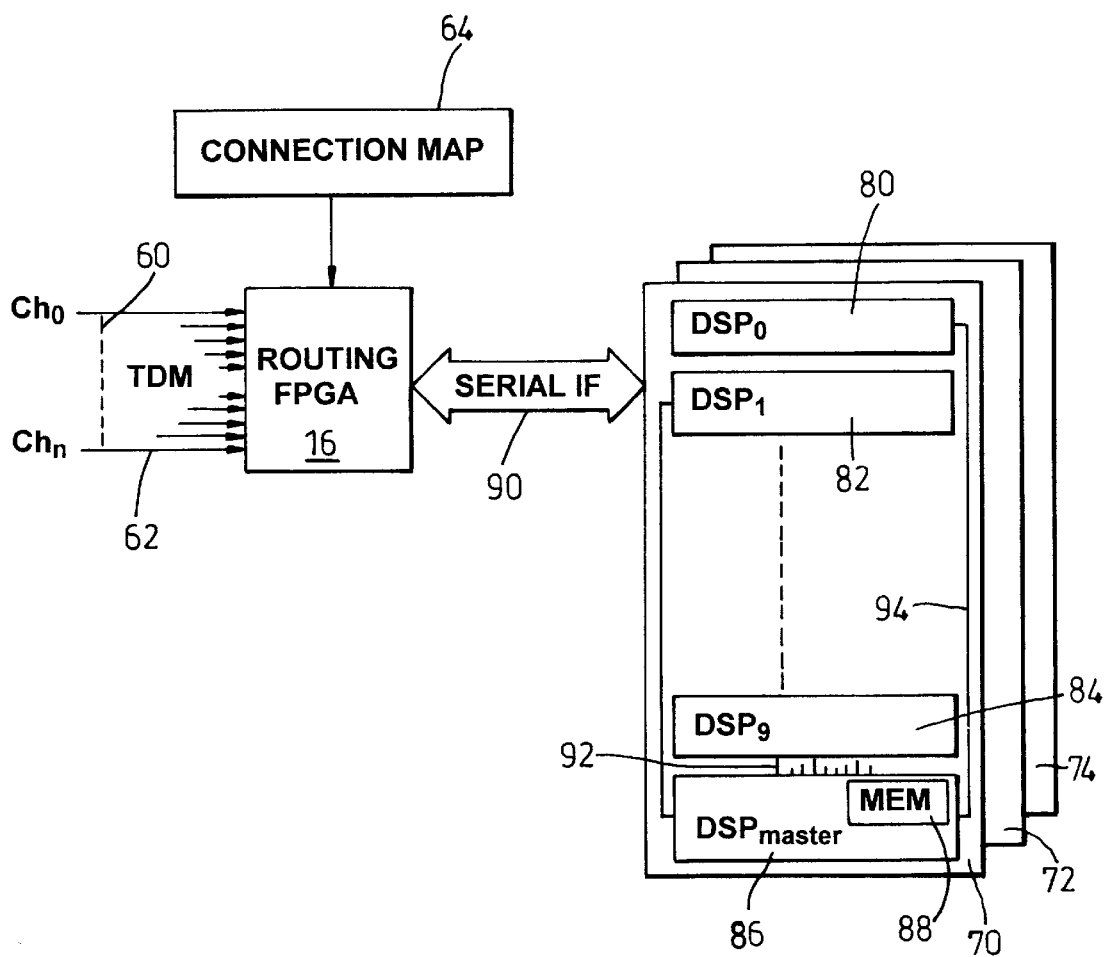
FIG. 2 is a more detailed block diagram illustrating a structural arrangement of an adaptation resource module according to a preferred embodiment of the present invention and as used in FIG. 1.

A preferred embodiment of the present invention, as shown in FIG. 2, has an architecture that provides a programmable adaptation capability. More particularly, increased functionality and an improved adaptation capability are provided by modularisation within the DSP environment 30 and the AAE 44 (that in association with the routing and signalling FPGA 16 together form an adaptation DSP resource module, ADR 50). The ADR 50 provides a cost effective and flexible adaptation capability between the asynchronous ATM domain and the narrowband (typically TDM) domain, whereby different adaptation methods can be independently programmed for each virtual channel.

In brief summary of the principal aspects of the present invention thus far described, the preferred architecture (as exemplified in FIG. 1) demonstrates modularization into: a routing and segregation/rate adaptation block (i.e. the FPGA 11); a programmable adaptation device (i.e. AAE 44 and AAL-0 processor 22); a routing and signalling FPGA 16; and DSP environment (or array) 30 that allows stacking of a plurality of DSP cards (reference numerals 70–74 of FIG. 2) onto a common bus architecture. Beneficially, the use of a modularised system (having individual cards partitioned on a functional basis) eliminates delay and minimises bandwidth on the ATM switch because no essential signal processing interactions occur across distinct cards; instead they are consolidated into single cards dedicated to particular functions.

As a design variant, AAL-0 processing may nonetheless be undertaken by an appropriately programmed AAE 44, which therefore eliminates the need for a specific AAL-0 processor.

The routing FPGA 16 is coupled to an associated memory 64 (located either internally or externally to the routing FPGA 16) that stores a connection map identifying the routing of individual DS-0s (i.e. individual channels) to specific DSP modules 70–74. For example, DS-$0_0$ to DS-$0_y$ are routed to DSP module 70, while DS-$0_{y+1}$ to DS-$0_n$ (where y<n) may routed to DSP module 74. In a narrowband-broadband interface module constructed according to the preferred embodiment of the present invention, there are approximately twenty DSP modules, although it will be appreciated that this number could vary dramatically. For a typical synchronous TDM data system, the routing FPGA 16 accesses the entire connection map about every 125$\mu$s (125×$10^{31\ 6}$ seconds).

The associated memory 64 may also act as a buffer to store information contained in DS-0s incident to the routing FPGA 16. In this way, the routing FPGA 16 can route blocks of DS-0s to different DSP modules at intervals defined by a pre-selected number of samples or frames. A suitable form of interface 90 between the routing FPGA 16 and each DSP module 70–74 is provided by an ESSI (enhanced synchronous serial) duplex interface, while it is also preferably to provide a plurality of separate interfaces 90 to each DSP module 70–74 to attain a high level of flexibility within the architecture of the preferred embodiment.

For the sake of clarity, only three slave DSPs 80–84, the master DSP 86 and interconnections have been shown in detail within FIG. 2.

Each DSP module 70–74 contains a farm of DSPs 80–86 of which a significant proportion are dedicated to voice processing. In the preferred embodiment, each farm contains nine separate DSPs assigned to voice processing and a single master DSP that acts to provide an additional level of indirection. Specifically, DS-0s 60–62 that are routed to a particular DSP module are then selectively routed or segregated by the master DSP (e.g. master DSP 86) for application to a particular slave DSP (within the farm) assigned to a voice processing function, such as echo cancellation. As such, the master DSP 86 is operationally coupled to each of the slave DSPs 80–84 (typically via a dedicated serial interface 92–94), with the master DSP 86 having a memory cache or associated memory 88 for use in storing and maintaining a DS-0 allocation table (for channel tracking purposes). Alternatively, the master DSP could function "on the fly" to assign DS-0s to slave DSPs according to a predetermined regime, randomly, or to take into account an instantaneous signal processing requirement of an individual channel (either as anticipated by receipt of a pre-identified channel or as appreciated by the master DSP following pre-processing). As will be appreciated, the instantaneous processing requirement of a channel can be assessed by simple pre-processing and embedded signalling detection and interpretation. Therefore, the master DSP can act as a dispatcher that routes traffic (information-bearing channels) to and from the other DSPs in the farm.

The master DSP 86 also functions to provide simple pre-processing of DS-0s, and is generally arranged to ensure that the slave DSPs co-operate to provide a concentration of functionality, whereby a single DSP is associated with a particular signal processing function, e.g. echo cancellation or tone detection/insertion. For example, in the former respect, the master DSP 86 may provide: a buffering function to facilitate indirection to an extent whereby blocks of samples (rather than individual samples) are applied to identified signal processor engines; simple tone detection; and/or signal normalisation. In the latter respect, it will be appreciated that DSP operation in accordance with a preferred operating mechanism of the present invention is optimised by partitioning functionality between different DSPs that perform dedicated (and assigned) signal processing functions. In this way, the architecture of the preferred embodiment of the present invention can be selectively structured to support (and signal process), for example: many channels on a few DSPs in the event that minimal signal processing is required for each channel; or, alternatively, few channels on few DSPs where signal processing of the few channels is intensive with respect to processor time and processor instruction demands. Consequently, the architecture of the preferred embodiment of the present invention can be easily extended to include additional DSP farms to enhance processing capabilities, generally, or to support new signal processing features.

A suitable DSP has an operating specification of about one hundred million instructions per second (MIPS) for filter co-processing and core processing, respectively. Such a DSP is the 56302 manufactured by Motorola, Inc., of Illinois, U.S.A.

Following the application of signal processing, processed voices channels and an associated control channel (that contains, for example, detected tones that identify control/signalling information) are routed either to AAE 44 or to AAL-0 processor 22, as will now be readily appreciated by the skilled addressee. The control information is packed into AAL-0 so that it can be transported across the broadband network to a remote signalling processor.

Although not shown, it will be appreciated that t he routing FPGA 16 is coupled to external high speed static random access memory (SRAM) having an approximate access time of about fifteen nanoseconds. As will be understood, the SRAM is used for: transmission (Tx)/ reception (Rx) buffer storage for all Tx/Rx RTA TDM traffic and signalling data; multi-frame RBS signalling assembly and disassembly; rate adaptation when interfacing with the ESSI interfaces for all DSP modules; and TDM interworking buses for the AAE device, such as AAE 44. The SRAM is typically supplemental to the associated memory 64.

Generally, the new system architecture can be considered to require the provision of:

1) a dual OC3 TDM interface (i.e. the FPGA 11) for providing a standard narrowband synchronous interface to the network adaptors. In other words, the FPGA performs an OC3 to DS-0 framing function;
2) a n ADR 50 according to the present invention that performs the core synchronous to asynchronous adaptation functionality and provides associated voice processing capabilities for each network adaptor. Furthermore, the ADR 50 (implemented as a separate card) also performs initial extraction/insertion of CCS and CAS messaging. As such, the ADR 50 is typically realised by a high capacity adaptation ASIC with an extensive DSP array;
3) a triple OC3 ATM interface, i.e. ATM switch 24, that provides the interface to the ATM network 26; and
4) an access signalling processor (ASP, not shown) that performs the function of signalling message insertion and extraction of CAS (channel associated signalling) or tones and CCS HDLC (common channel signalling for high-level data link control) frame forwarding.

The architecture of the preferred embodiment of the present invention (both in terms of the physical and functional distribution of DSPs together with the physical modularisation realised by the IC card arrangement within the interface) advantageously provides a cost-effective structure that has a level of flexibility sufficient to support a programmable ATM protocol adaptation capability, i.e. the ability to support differing AAL-x protocols each requiring differing signal processing functions. Indeed, the present invention is programmably configurable on a per channel (DS0) basis, whereby different channels can be processed by DSPs capable of supporting functions such as echo cancellation, tone detection/generation and others (as will be readily appreciated). Consequently, the present invention provides a flexible interface between an adaptation capability and a DSP capability to an extent whereby the interface can handle widely varying and different system requirements, e.g. national UK telecommunication calls and international or cross-continental telecommunication traffic.

It is envisaged that, in a preferred embodiment, the connection map stored in the associated memory 64 is programmable to allow additional DSP cards (i.e. modular processing platforms) to be easily integrated to support expansion of the operational capacity of the system, generally. For example, a subsequently appended module may support a particular signal processing function, or may be a general card that simply enhances channel handling capacity.

The architecture of the present invention can therefore be considered to provide both a modularity and an ability to provide a dedicated resource, which architecture is both more flexible than a system that has a fixed number of functional resources and is preferably over a system that contains pooled resources. Indeed, the preferred embodiment of the present invention maintains the flexibility otherwise provided by pooled resources, but is preferable because such flexibility is attained at both lower cost and with reduced bandwidth.

As an aside, in the case of pooled resources and unlike the architecture of the preferred embodiment, it is necessary to provide additional bandwidth for interactive communication between the pooled resources, with this also involving more complicated system control.

Additionally, the various DSP cards can be easily re-configured, replaced or adapted to support different signal processing functions. In fact, every DSP may always contain the necessary functionality (as firmware or the like) to implement every signal processing functions, although the DSP (or, in fact, an ADR) may actually be assigned to perform a specific (or unique) task. More explicitly, each ADR contains a memory and a connection map that expressly identifies relevant cross-connections between DS-0s and signal processing requirements. In other words, a spare ADR, for example, can have sufficient information pertaining to the interface environment (i.e. all the ADR cards, for example) to commence immediate and complementary operation upon coupling into the interface. For example, the necessary information includes essential call state information identifying whether a particular DS-0 requires echo cancellation. In this way, the system modularity of the present invention provides so-called "warm standby" inasmuch as each DSP may contain all necessary (or at least the most commonly used) digital signal processing algorithms that are critical or significant to effective multi-protocol adaptation systems, with warm standby allowing a one spare ADR card to N card back-up. As such, the present invention is less expensive than so-called "hot standby" systems that rely on the introduction and use, in failure scenarios, of fully redundant hardware. Furthermore, the system of the present invention is more efficient are more readily adaptable than system that require all critical software functions to be downloaded in real-time to mitigate against the effects of component failure or malfunction.

Figure 3:
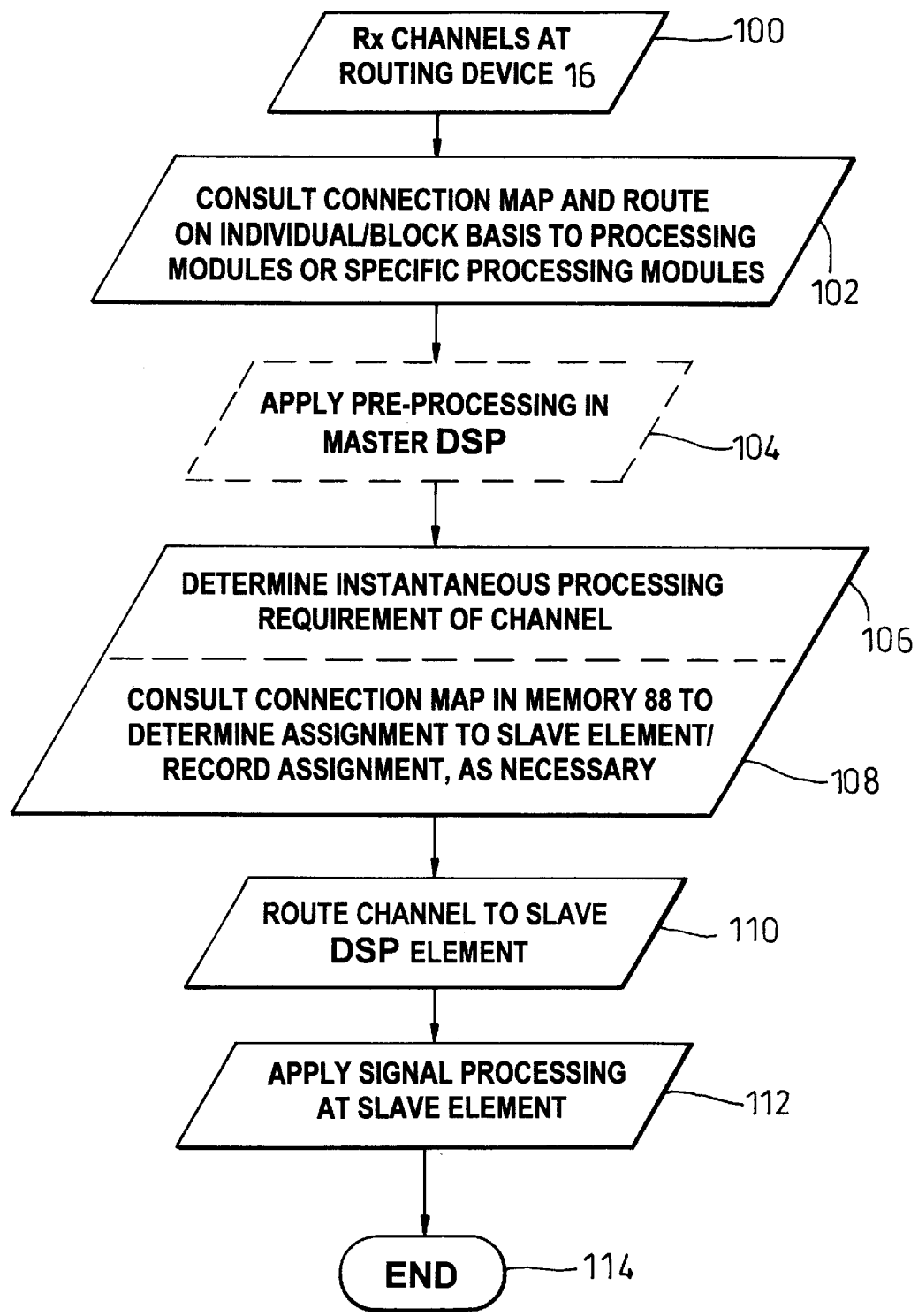
FIG. 3 is a flow diagram illustrating an allocation of signal processing responsibility, as supported by the preferred embodiment of the present invention.

As a summary of the principal operating procedure undertaken by the novel and inventive architecture of the preferred embodiment, reference is made to FIG. 3. Signal processing and, specifically, resource assignment with respect to signal processing begins at block 100 when information bearing-channels are received at routing device 16. Consultation with the connection map allows routing (step 102) of channels on individual or block basis to processing modules, generally, or specific modules (determined, perhaps, on the basis of channel numbers). Optionally, pre-processing (step 104) of the information-bearing channels can occur in the master DSP of each processing module (e.g. card 72). The master DSP can either determine an instantaneous processing requirement for the channel and assign to an appropriate slave element (step 106), or it can consult (step 108) its own connection map to determine assignment to a particular slave element. Of course, random assignment could also be tolerated provided that all slave DSPs contained all appropriate signal processing capabilities. If appropriate, the assignment to a specific slave DSP can then also be recorded in memory 88 (for use with respect to step 106). After an appropriate slave DSP has been identified, routing to that slave DSP can occur (step 110). Signal processing (step 112) of the information contained in the channel can then be executed within the slave DSP. The process then ends at step 114.

While the foregoing description has concentrated on a narrowband to broadband information flow, it will clearly be appreciated that the preferred architecture and methodology of the present invention are equally applicable to a reverse information flow from a broadband domain to a synchronous narrowband domain. In this respect, the connection map 64 may also contain reverse mapping information, while the DSPs on each card support and apply complementary signal processing functions, such as tone-driven commands.

The numerous aspects of the preferred embodiment of the present invention therefore produce a flexible arrangement with respect to signal processing that can be easily altered to accommodate different processing demands imposed by differing channel types (or numbers of channels). Indeed, the present invention is able to provide a flexible selection between a number of DSP cards which is advantageous when compared with prior art static systems in which there is a direct relationship between DSP processing and the AAE that curtails any ability to add additional signal processing cards.

The aspects of the present invention therefore advantageously combine to provide an interface that is partitioned on an ATM core, and which contains a number of independently operable resource modules in which every inter-working function between a narrowband and a broadband domain is actionable on every card. This arrangement provides a fully flexible system that has self-contained cards that provide optimal functional placement and maximum efficiency in operation. Indeed, the flexibility provided by the configuration of the preferred embodiment also lends itself to system growth, since new cards can be added to bolster processing power and capacity. Moreover, the hierarchy of indirection buys an ability to fractionally distribute both bandwidth and processing power. Specifically, each resource module can therefore perform (to a varying degree of efficiency) all signal network inter-working functions, such as required for: i) signal extraction; ii) signal processing (in the sense, for example, of tone detection, echo cancellation and the like); and iii) ATM adaptation.

In relation to the specification, the term "processing" should be considered to have sufficient latitude, as necessary in the context of its usage, to include signal processing in relation to traffic, control channel processing (e.g. in relation to RBS and signal extraction) and protocol adaptation. Similarly, the term "information-bearing channel" is equally applicable across both narrowband and broadband domains, and should be considered in context and not be restricted to specific synchronous or asynchronous forms of communication.

It will, of course, be understood that the above description has been given by way of example only and that modification in detail may be made within the scope of the present invention. For example, while the preferred embodiment of the present invention has been described, principally, in relation to AAL-1 and AAL-0, it will readily be appreciated that the modularity and distributed digital signal processing arrangement (i.e. the functional partitioning of tasks and DS-0s to particular DSPs) is equally applicable to other communication systems that operate different signalling protocols. Also, while the invention has generally been described in relation to adaptation protocols, the architecture of the present invention is sufficiently flexible to allow its application to communication systems that generally need to provide alternative signalling schemes that impose differing signal processing requirements. In this regard, it will be appreciated that the narrowband-broadband interface may, in fact, contain many different ATM adaptation entities (AAEs), with the preferred embodiment merely indicating a suitable configuration for two alternatives, namely AAL-0 and AAL-1.

Another variation of the underlying inventive premise relates to the determination at either the routing FPGA 16 or at a master DSP of the present processing utilisation of, respectively, a processing platform (e.g. card 74) or of an individual DSP. Specifically, in the event that a card or slave DSP has a relatively high loading with respect to its available processing capacity (in terms of millions of operations per second), then the routing FPGA 16 or a master DSP, as appropriate, can re-distribute channels to other suitable platforms or slave devices, respectively; this again provides for a more effective system that has great flexibility. In relation to a suitable form of handling assessment, the master DSP, for example, can rely on recent historic information (stored in memory 88) identifying recent processing assignments to specific slave DSPs, or alternative mechanism that are known generally within the art.

What is claimed is:

1. A signal processing environment for an interface that interconnects a plurality of information-bearing channels between a broadband network and a narrowband network, the signal processing environment comprising:

at least one processing platform for selectively applying signal processing functions to at least some of the plurality of information-bearing channels, the at least one processing platform having a master signal processing element and a plurality of slave signal processing elements operationally responsive to the master signal processing element, the master signal processing element coupled to receive the plurality of information-bearing channels and arranged to apply a routing function to the plurality of information-bearing channels such that signal processing of at least some of the plurality of information-bearing channels is selectively distributed between the plurality of slave signal processing elements, wherein the plurality of slave processing elements each support a plurality of signal processing functions and the master processing element can dynamically vary the distribution of information-bearing channels according to instantaneous signal processing demands of individual information-bearing channels.

2. The signal processing environment according to claim 1, wherein the plurality of slave processing elements each have dedicated signal processing functions assigned thereto.

3. The signal processing environment according to claim 1, wherein in the master processing element provides pre-processing of the plurality of information-bearing channels, said pre-processing by the master processing element providing at least one of: a buffering function to facilitate indirection of the blocks of samples to the plurality of slave signal processing elements: tone detection; and signal normalisation.

4. The signal processing environment according to claim 3, further comprising a memory associated with the master processing element, the memory containing a connection map detailing signal processing functions executable by individual ones of the plurality of slave processing elements.

5. The signal processing environment according to claim 1, further comprising a plurality of processing platforms each for selectively applying signal processing functions to at least some of the plurality of information-bearing channels, each processing platform having a master signal processing element and a plurality of slave signal processing elements operationally responsive to the master signal processing element, the master signal processing element coupled to receive the plurality of information-bearing channels and arranged to apply a routing function to the plurality of information-bearing channels such that signal processing of at least some of the plurality of information-bearing channels is selectively distributed between the plurality of slave signal processing elements.

6. The signal processing environment according to claim 5, wherein at least one of the plurality of processing platforms is provided as a plug-in module.

7. The signal processing environment according to claim 5, further comprising a routing device coupled to receive the plurality of information-bearing channels and further coupled to the plurality of processing platforms, the routing device arranged to distribute signal processing for the plurality of information-bearing channels between said plurality of processing platforms.

8. The signal processing environment according to claim 7, the routing device containing an associated memory having a connection map and wherein the distribution of the plurality of information-bearing signals is based on the connection map.

9. The signal processing environment according to claim 8, wherein the connection map is programmable.

10. The signal processing environment according to claim 5, wherein at least some of the plurality of processing platform support signal network inter-working functions between a narrowband network and a broadband network, and at least one of the plurality of processing platforms is configured to perform a warm standby and contains an associated memory having a system map detailing processing functions associated with individual information-bearing channels, said signal network inter-working functions including at least one of: signal extraction; tone detection; echo cancellation; and ATM adaptation.

11. The signal processing environment according to claim 10, wherein each of the plurality of processing platform support signal network inter-working functions between a narrowband network and a broadband network, said signal network inter-working functions including at least one of: signal extraction; tone detection; echo cancellation; and ATM adaptation.

12. The signal processing environment according to claim 1, wherein the slave processing elements support at least one function from the list of: signal extraction; signal processing; and protocol adaptation.

13. The signal processing environment according to claim 12, wherein the signal processing function includes one of: echo cancellation; tone detection; tone generation; and voice compression.

14. The signal processing environment according to claim 12, wherein the protocol adaptation is ATM adaptation.

15. The signal processing environment according to claim 1, wherein the at least one processing platform supports signal network inter-working functions between a narrowband network and a broadband network, said signal network inter-working functions including at least one of: signal extraction; tone detection; echo cancellation; and ATM adaptation.

16. The signal processing environment according to claim 1, further associated with a memory containing a system map detailing processing functions associated with individual information-bearing channels.

17. A signal processing platform module for integrating into the signal processing environment of claim 1, the module containing a processing platform for selectively applying signal processing functions to at least some of the plurality of information-bearing channels, the module having:

a master signal processing element and a plurality of slave signal processing elements operationally responsive to the master signal processing element, the master signal processing element coupled to receive the plurality of information-bearing channels and arranged to apply a routing function to the plurality of information-bearing channels such that signal processing of at least some of the plurality of information-bearing channels is selectively distributed between the plurality of slave signal processing elements; and an associated memory containing a system map detailing processing functions associated with individual information-bearing channels.

18. The module of claim 17, wherein the module supports signal network inter-working functions between a narrowband network and a broadband network, said signal network inter-working functions including at least one of: signal extraction; tone detection; echo cancellation; and ATM adaptation.

19. A signal processing platform for selectively applying signal processing functions to at least some of a plurality of information-bearing channels incident thereto, the signal processing platform having:

a plurality of slave signal processing elements; and a master signal processing element coupled to receive the plurality of information-bearing channels and configured with a routing function arranged to route the plurality of information-bearing channels to the plurality of slave processing elements, the routing function distributing signal processing of at least some of the plurality of information-bearing channels between the plurality of slave signal processing elements, wherein the master processing element can dynamically vary the distribution of information-bearing channels according to instantaneous signal processing demands of individual information-bearing channels.

20. The signal processing platform according to claim 19, wherein the at least one processing platform supports signal network inter-working functions between a narrowband network and a broadband network, said signal network inter-working functions including at least one of: signal extraction; tone detection; echo cancellation; and ATM adaptation.

21. The signal processing platform of claim 20, wherein the plurality of slave processing elements each have dedicated signal processing functions assigned thereto.

22. The signal processing platform of claim 19, wherein the routing function performs a selective routing of information-bearing channels dependent upon processing requirements of information-bearing channels.

23. The signal processing platform according to claim 19, wherein the plurality of slave processing elements each support a plurality of signal processing functions.

24. The signal processing platform according to claim 19, further comprising a memory associated with the master processing element, the memory containing a connection map detailing signal processing functions executable by individual ones of the plurality of slave processing elements.

25. The signal processing platform according to claim 19, further comprising a memory associated with the master processing element, the memory containing a system map detailing processing functions associated with individual information-bearing channels.

26. The signal processing platform according to claim 19, wherein the memory further stores essential call state information for each of the plurality of information-bearing channels.

27. A communication system interface responsive to a plurality of information-bearing channels, the interface comprising:

a plurality of processing platforms for applying signal processing functions to at least some of the plurality of information-bearing channels; and a routing device coupled to the plurality of processing platforms and responsive to the plurality of information-bearing channels, the routing device configured to distribute the plurality of information-bearing channels between the plurality of processing platforms, wherein the interface interconnects the plurality of information-bearing channels between a broadband network and a narrowband network.

28. The communication system interface of claim 26, wherein each of the plurality of processing platforms supports signal network inter-working functions between the narrowband network and the broadband network, said signal network inter-working functions including at least one of: signal extraction; tone detection; echo cancellation; and ATM adaptation.

29. The communication system interface of claim 27, wherein the plurality of processing platforms each have dedicated signal processing functions assigned thereto.

30. A method of providing signal processing to a plurality of channels incident to a processing farm containing a plurality of slave elements each having a signal processing capability and a master control element both coupled to the plurality of slave elements and arranged to receive the plurality of information-bearing channels, the method comprising the steps of:

provantage the master control element with a routing function that selectively routes information-bearing channels to specified ones of the plurality of slave processing elements;

receiving an information-bearing channel; and applying the routing function to distribute signal processing of at least some of the plurality of information-bearing channels between the plurality of slave elements; wherein the master processing element dynamically varies the distribution of information-bearing channels according to instantaneous signal processing demand of each individual information-bearing channel.

31. The method of claim 30, further comprising the step of pre-processing an information-bearing channel in the master control element, said pre-processing by the master processing element providing at least one of: a buffering function to facilitate indirection of the blocks of samples to the plurality of slave signal processing elements; tone detection; and signal normalisation.

32. The method of claim 30, wherein the routing function performs a selective routing of information-bearing channels dependent upon processing requirements of information-bearing channels.

33. The method of claim 30, wherein the information-bearing channels provided to the master control element emanate from both a broadband network and a narrowband network.

34. The method of claim 30, wherein the slave elements each support at least one processing function from the list of: echo cancellation; tone detection; tone generation; protocol adaptation; and voice compression.

35. The method of claim 30, wherein the processing farm supports signal network inter-working functions between a narrowband network and a broadband network, said signal network inter-working functions including at least one of: signal extraction; tone detection; echo cancellation; and ATM adaptation.

36. The method of claim 30, wherein the processing board is one of a plurality of processing boards each providing signal processing capabilities, the method further comprising the step of:

locating a channel routing device at an interface coupled to receive the plurality of information-bearing channels, the channel routing device coupled to each of the plurality of processing boards; and selectively routing each of the plurality of information-bearing channels to a selected one of the plurality of processing boards using the channel routing device.

37. The method of claim 36, wherein each one of the plurality of processing boards is realised as a replaceable module.

38. The method of claim 36, wherein the step of selectively routing further comprises the step of routing information-bearing channels to each processing board in blocks of information-bearing channels.

39. A method of providing signal processing to a plurality of information-bearing channels incident to an interface having a routing device coupled to a plurality of processing platforms each arranged to support signal network inter-working functions bi-directionally between a narrowband network and a broadband network, the method comprising the steps of:

in the routing device, dynamically varying distribution of the plurality of information-bearing channels between the plurality of processing platforms and according to instantaneous signal processing demand of each individual information-bearing channels; and applying processing to at least some of the information-bearing channels in a processing platform to which the information-bearing channels have been routed;

wherein said signal network inter-working functions including at least one of: signal extraction; time detection; echo cancellation; and ATM adaptation.

* * * * *